(12) United States Patent
Lin et al.

(10) Patent No.: US 12,479,342 B2
(45) Date of Patent: Nov. 25, 2025

(54) CHILD SAFETY SEAT

(71) Applicant: NINGBO WELLDON INFANT AND CHILD SAFETY TECHNOLOGY CO., LTD., Ningbo (CN)

(72) Inventors: Jiangjuan Lin, Ningbo (CN); Huanle Xia, Ningbo (CN)

(73) Assignee: NINGBO WELLDON INFANT AND CHILD SAFETY TECHNOLOGY CO., LTD., Ningbo (CN)

( * ) Notice: Subject to any disclaimer, the term of this patent is extended or adjusted under 35 U.S.C. 154(b) by 175 days.

(21) Appl. No.: 18/370,887

(22) Filed: Sep. 21, 2023

(65) Prior Publication Data
US 2024/0359603 A1    Oct. 31, 2024

(30) Foreign Application Priority Data
Apr. 26, 2023   (CN) .......................... 202310462759.0

(51) Int. Cl.
*B60N 2/28*    (2006.01)
(52) U.S. Cl.
CPC ......... *B60N 2/2851* (2013.01); *B60N 2/2872* (2013.01)
(58) Field of Classification Search
CPC ............................ B60N 2/2851; B60N 2/2872
See application file for complete search history.

(56) References Cited

U.S. PATENT DOCUMENTS

| | | | | |
|---|---|---|---|---|
| 7,055,903 B2* | 6/2006 | Balensiefer | .......... | B60N 2/2821 297/250.1 X |
| 7,066,536 B2* | 6/2006 | Williams | ............... | B60N 2/818 297/250.1 X |
| 7,232,185 B2* | 6/2007 | Hartenstine | .......... | B60N 2/2851 297/250.1 X |
| 7,370,912 B2* | 5/2008 | Williams | ............... | B60N 2/803 297/250.1 |
| 8,113,579 B2* | 2/2012 | Fiore, Jr. | ................. | B60N 2/879 297/217.6 |
| 8,136,880 B2* | 3/2012 | Biaud | .................. | B60N 2/2872 297/250.1 |
| 9,067,516 B2* | 6/2015 | Hutchinson | .......... | B60N 2/803 |

(Continued)

FOREIGN PATENT DOCUMENTS

| CN | 109228978 A | 1/2019 |
|---|---|---|
| CN | 212500026 U | 2/2021 |

(Continued)

*Primary Examiner* — Rodney B White
(74) *Attorney, Agent, or Firm* — Bayramoglu Law Offices LLC

(57) ABSTRACT

A child safety seat includes a backrest and a base. The backrest and the base are detachably connected. The backrest is provided with a headrest that is movable up and down. Side wings are provided at two sides of the headrest. The side wings are connected to the backrest through rotating shafts. Opposite sides of the side wings are provided with slide rails. The slide rails are spiral. The headrest is provided with sliders matched with the slide rails. The slide rails are provided in a same direction as the rotating shafts. The child safety seat has the following advantages. The sliders are slid up and down to unfold or fold the side wings, thereby adjusting a width of the side wings to suit different users. Such a linkage structure occupies less space and spares more space for other components of the backrest.

9 Claims, 19 Drawing Sheets

(56) References Cited

U.S. PATENT DOCUMENTS

| | | | | |
|---|---|---|---|---|
| 9,114,739 B2* | 8/2015 | Conway | ............... | B60N 2/2863 |
| 9,132,754 B2* | 9/2015 | Mindel | ............... | B60N 2/2869 |
| 9,610,868 B2* | 4/2017 | Zhang | ................. | B60N 2/2872 |
| 2010/0308631 A1* | 12/2010 | Biaud | ................. | B60N 2/2851 |
| | | | | 297/256.11 |
| 2013/0161986 A1* | 6/2013 | Kopp | ................... | B60N 2/2851 |
| | | | | 297/250.1 |
| 2016/0114705 A1* | 4/2016 | Morgenstern | ........ | B60N 2/2866 |
| | | | | 297/250.1 |
| 2019/0232826 A1* | 8/2019 | Lehman | ............... | B60N 2/2851 |
| 2022/0396182 A1* | 12/2022 | Mo | ..................... | B60N 2/2851 |
| 2023/0086257 A1 | 3/2023 | Smith | | |
| 2024/0116413 A1* | 4/2024 | Berg | ................... | B60N 2/2872 |

FOREIGN PATENT DOCUMENTS

| | | |
|---|---|---|
| CN | 213292071 U | 5/2021 |
| CN | 113071391 A | 7/2021 |
| CN | 116001658 A | 4/2023 |
| WO | 2010088248 A1 | 8/2010 |

* cited by examiner

CHILD SAFETY SEAT

CROSS REFERENCE TO THE RELATED APPLICATIONS

This application is based upon and claims priority to Chinese Patent Application No. 202310462759.0, filed on Apr. 26, 2023, the entire contents of which are incorporated herein by reference.

TECHNICAL FIELD

The present disclosure relates to the technical field of safety seats, and in particular to a child safety seat.

BACKGROUND

A child safety seat includes a belt assembly or flexible component with safety buckles, an adjustment device, a connection device, and an auxiliary device (such as a carrycot, a baby carrier, an auxiliary seat, or a collision protection device). The child safety seat is fixed to a vehicle through a mounting and locking device to limit the movement of a child's body and reduce the harm to the child caused by an unexpected event such as collision or sudden deceleration.

In the prior art, most child safety seats have a fixed shape, and an integrated structure formed by components such as a base, a backrest, and a headrest that are connected together, making it impossible to fold the child safety seat completely or partially to adapt to different body types of children. There are a few child safety seats that are foldable, but they only allow simple distance adjustment through a guide slot, which is inconvenient to operate.

SUMMARY

An objective of the present disclosure is to provide a child safety seat that can simultaneously adjust a headrest and side wings.

Another objective of the present disclosure is to provide a child safety seat with a simple structure and small space occupation.

The present disclosure adopts the following technical solution. A child safety seat includes a backrest and a base, where the backrest and the base are detachably connected; the backrest is provided with a headrest that is movable up and down; side wings are provided at two sides of the headrest; the side wings are connected to the backrest through rotating shafts; opposite sides of the side wings are provided with slide rails; the slide rails are spiral; the headrest is provided with sliders matched with the slide rails; and the slide rails are provided in a same direction as the rotating shafts.

Compared with the prior art, the present disclosure has the following advantages. An ordinary linear rail matched with a slider remains stationary and can only achieve linear movement of the slider. In contrast, in the present disclosure, due to the spiral shape of the slide rails matched with the sliders, when the sliders are moved up and down in a straight line, the slide rails are driven by the sliders, resulting in transverse movement. The rotating shafts convert the transverse movement into rotation, which in turn drives the side wings to rotate and unfold. The up and down movement of the sliders follows the movement of the headrest, allowing the headrest to be linked with the side wings. The sliders are slid up and down to unfold or fold the side wings, thereby adjusting a width of the side wings to suit different users. Such a linkage structure occupies less space and spares more space for other components of the backrest. In addition, the child safety seat features a simple structure, high reliability, and low production cost. The detachable backrest and base are convenient for storage in idle times. After the backrest is disassembled, the base can serve as a booster cushion, extending the applicable age range of the child safety seat.

In some embodiments of the present disclosure, two sides of the backrest are provided with inwardly recessed mounting slots; the rotating shafts are provided in the mounting slots; a gap is provided between the side wing and the backrest; the backrest is provided with backrest frames; one side of the backrest frame is abutted against a side wall of the mounting slot; and the base is provided with a base frame.

Further, the backrest is provided with a hollow inner chamber; a top of the inner chamber is provided with a notch; the notch is connected to an outside; a part of the headrest passes through the notch, and is provided in the inner chamber; the mounting slot is provided with a through slot communicated with the inner chamber; a part of the slide rail passes through the through slot, and is provided in the inner chamber; and a width of the through slot is greater than a width of the slide rail.

In some embodiments of the present disclosure, a length direction of the rotating shaft extends along a length direction of the backrest; the rotating shaft is made of metal; and a distance between the slide rail and a movement route of the headrest gradually increases from bottom to top.

Further, the backrest is provided with at least two fixing slots arranged transversely; the fixing slots are connected to an outside; the base is provided with fixed shafts matched with the fixing slots; the backrest is provided with at least one first locking mechanism for clamping the fixed shafts; the fixing slots are provided in the backrest frames; the fixed shafts are connected to the base frame; the fixing slot includes a first fixing slot and a second fixing slot; the first fixing slot transversely runs through to the outside; the second fixing slot is connected to the outside through a first inclined slot; and the first inclined slot is inclined towards a side towards which the first fixing slot is opened.

Further, the first locking mechanism includes a mounting base, a locking element, and a locking pin; the locking element is rotatably connected to the mounting base; the locking pin is slidably connected to the mounting base; the locking element is provided with a limit slot and a stopper; when the fixed shaft is in a locked state, the locking pin is abutted against the stopper, and the second fixing slot forms a closed structure with the limit slot; when the fixed shaft is in an unlocked state, one side of the limit slot is provided in the second fixing slot; a reset spring for resetting the locking element is provided between the locking element and the mounting base; the mounting base is connected to the backrest frame; and the backrest is provided with an unlocking puller linked to the locking pin.

Further, a bottom of the backrest is provided with at least one downward guide lug; the base is provided with a guide slot matched with the guide lug; the fixing slot is provided in the guide lug, and the fixed shaft is provided in the guide slot; there are two guide lugs and two guide slots matched with the two guide lugs; the fixed shaft runs through the two guide slots; the backrest is provided with an upper channel; the base is provided with a lower channel; the upper channel is communicated with the lower channel; the upper channel is provided between the two guide lugs; the lower channel is provided between the two guide slots; and the lower channel is provided between two adjacent fixed shafts.

Further, the headrest is provided with a second locking mechanism; the second locking mechanism is provided at a back of the headrest; the headrest is provided with a shoulder belt hole; the second locking mechanism includes a locking pin shaft and multi-position fixing plates; the locking pin shaft is provided below the shoulder belt hole; the locking pin shaft is connected to the headrest; the fixing plates are connected to the backrest; the fixing plates are connected to the backrest frames; the backrest frames are symmetrically arranged; two ends of the locking pin shaft are respectively connected to the fixing plates at two sides; the fixing plate is provided with a U-shaped cross-section; and the U-shaped cross-section includes one side provided with a position slot and the other side connected to the backrest frame.

Further, the base is provided with a seat belt slot; the seat belt slot is provided in a central position of an upper surface of the base; the seat belt slot is provided with a cover plate that is rotatable to be opened; the seat belt slot is provided with symmetrical waist belt holes at two sides; a crotch belt hole is provided in front of the seat belt slot; the base frame is provided with a first reinforcing rod and a second reinforcing rod; the first reinforcing rod is provided behind the waist belt holes; the second reinforcing rod is provided below the crotch belt hole; a back of the backrest is provided with an upper cover plate that is rotatable to be opened; a back of the base is provided with a lower cover plate that is rotatable to be opened; binding holes are provided at two sides of the backrest; the base is provided with a storage chamber; and the storage chamber is provided with a side cover plate that is rotatable to be opened.

Further, the base is provided with cup holders; the cup holders are provided at two sides of the base; the base is provided with arc-shaped concaves; the cup holders are provided in the arc-shaped concaves; the base is provided with positioning slots; the cup holder is provided with a positioning element matched with the positioning slot; the positioning slot is communicated with the arc-shaped concave; the cup holder is provided with a buckle slot; the base is provided with a buckle matched with the buckle slot; the base is provided with a button; the button is linked with the buckle; the second locking mechanism includes an unlocking slider; the unlocking slider is provided with a second inclined slot; the locking pin shaft is inserted into the second inclined slot; and one end of the unlocking slider is rotatably connected to the headrest.

Figure 1:
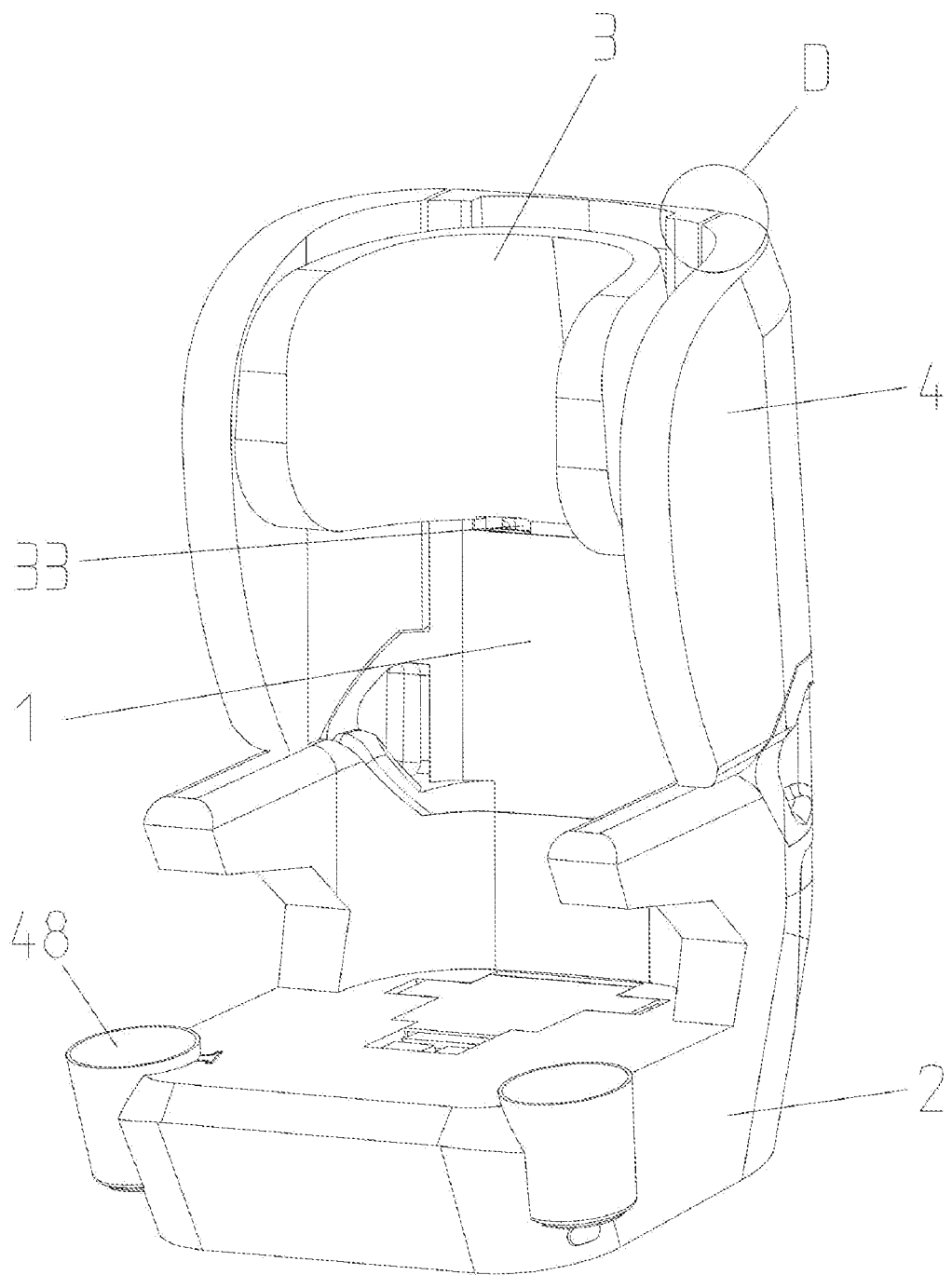
FIG. 1 is a structural diagram of a child safety seat according to Embodiment 1 of the present disclosure.
Figure 2:
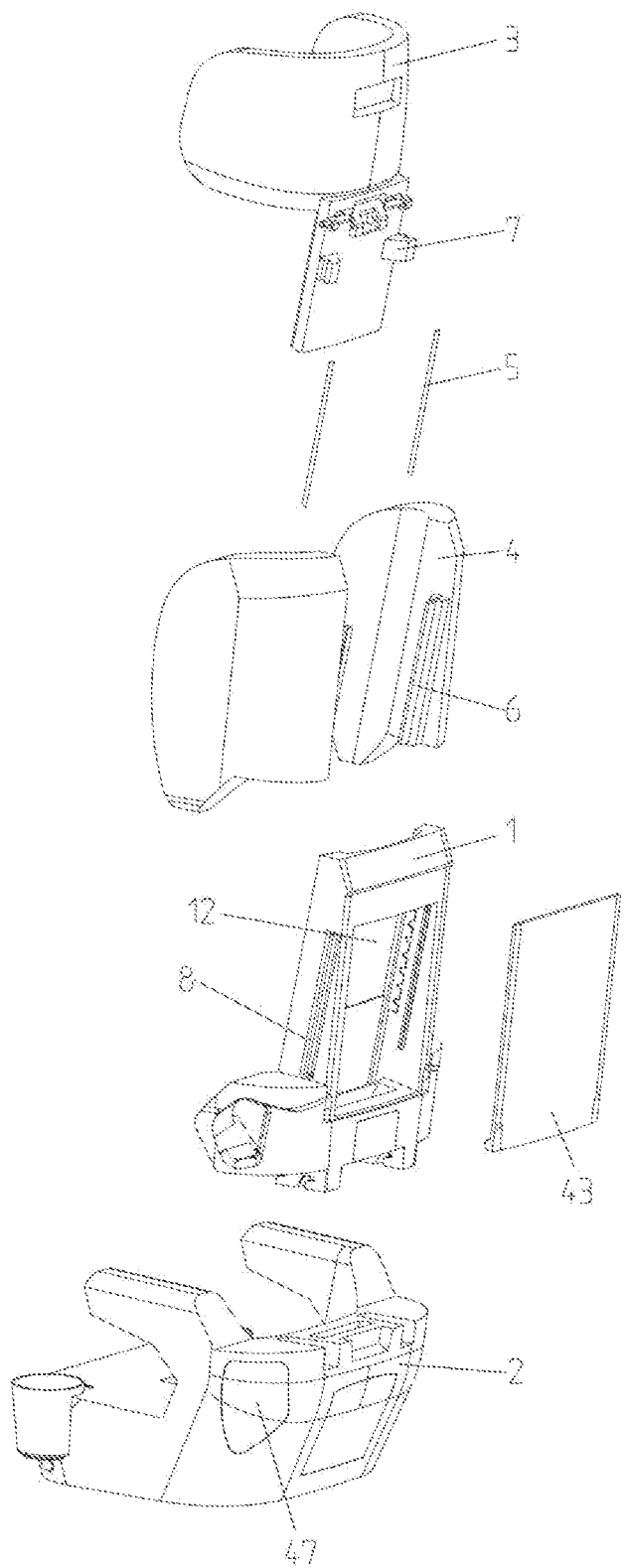
FIG. 2 is an exploded view of a backrest according to Embodiment 1 of the present disclosure.
Figure 3:
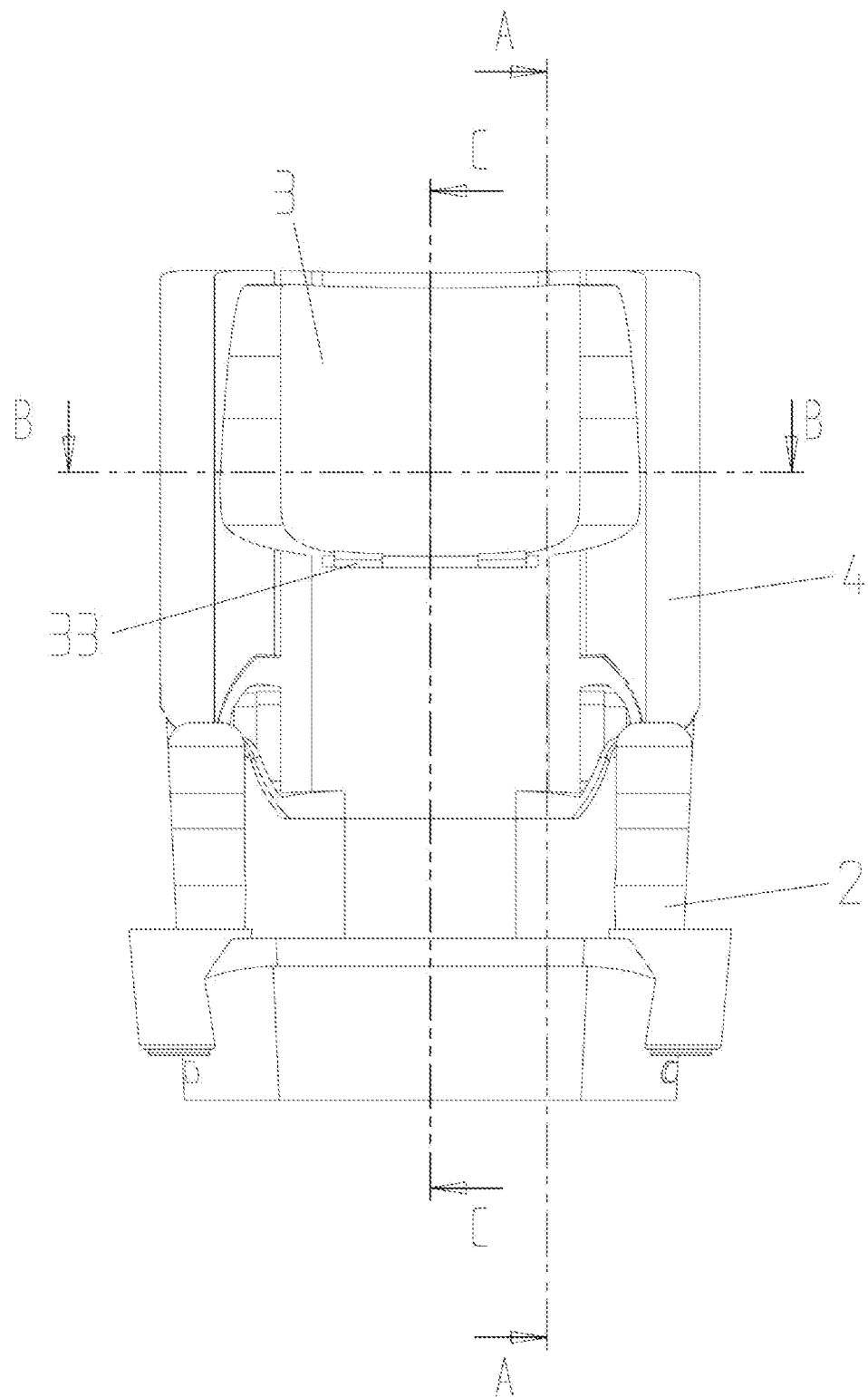
FIG. 3 is a front view of the child safety seat according to Embodiment 1 of the present disclosure.
Figure 4:
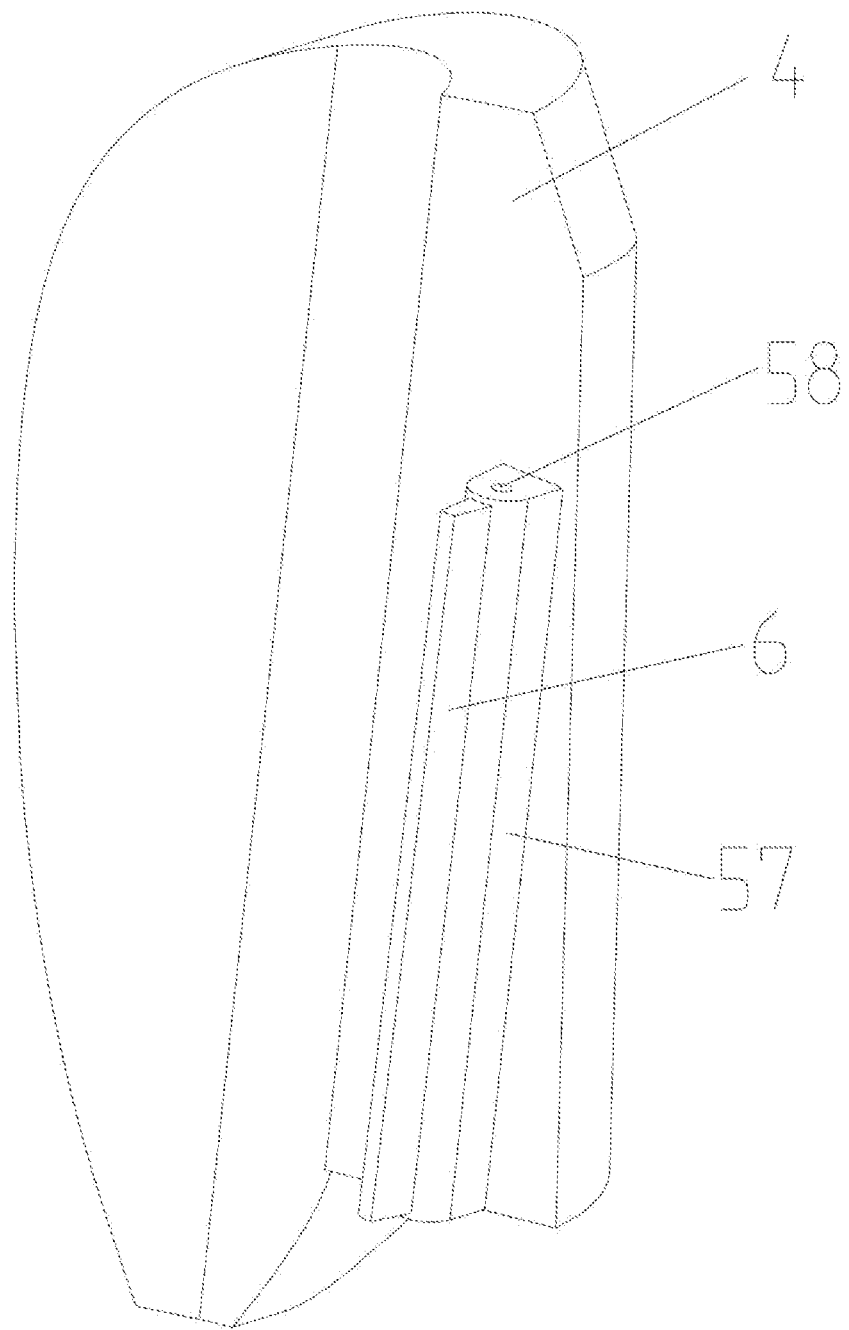
FIG. 4 is a structural diagram of a side wing according to Embodiment 1 of the present disclosure.

Reference Numerals: 1. backrest; 2. base; 3. headrest; 4. side wing; 5. rotating shaft; 6. slide rail; 7. slider; 8. mounting slot; 9. gap; 10. backrest frame; 11. base frame; 12. inner chamber; 13. notch; 14. through slot; 15. fixing slot; 16. fixed shaft; 17. first locking mechanism; 18. first fixing slot; 19. second fixing slot; 20. first inclined slot; 21. mounting base; 22. locking element; 23. locking pin; 24. limit slot; 25. stopper; 26. reset spring; 27. unlocking puller; 28. guide lug; 29. guide slot; 30. upper channel; 31. lower channel; 32. second locking mechanism; 33. shoulder belt hole; 34. locking pin shaft; 35. fixing plate; 36. position slot; 37. seat belt slot; 38. cover plate; 39. waist belt hole; 40. crotch belt hole; 41. first reinforcing rod; 42. second reinforcing rod; 43. upper cover plate; 44. lower cover plate; 45. binding hole; 46. storage chamber; 47. side cover plate; 48. cup holder; 49. arc-shaped concave; 50. positioning slot; 51. positioning element; 52. buckle slot; 53. buckle; 54. button; 55. unlocking slider; 56. second inclined slot; 57. rotating shaft base; 58. rotating shaft hole; 59. sliding slot; and 60. moving element.

DETAILED DESCRIPTION OF THE EMBODIMENTS

To further describe the technical means adopted by the present disclosure to achieve the intended purpose and the effects of the technical means, the specific implementations, structures, features, and effects of the present disclosure are described in detail below with reference to the drawings and preferred embodiments.

Embodiment 1

This embodiment provides a child safety seat. As shown in FIGS. 1 to 4, the child safety seat includes backrest 1 and base 2. The backrest 1 and the base 2 are detachably connected. The backrest 1 is provided with headrest 3 that is movable up and down. Side wings 4 are provided at two sides of the headrest 3. The side wings 4 are connected to the backrest 1 through rotating shafts 5. Opposite sides of the side wings 4 are provided with slide rails 6. The slide rails 6 are spiral. The headrest 3 is provided with sliders 7 matched with the slide rails 6. The slide rails 6 are provided in a same direction as the rotating shafts 5. The side wing 4 is provided with rotating shaft base 57. The rotating shaft base 57 is provided with rotating shaft hole 58. The rotating shaft 5 passes through the rotating shaft hole 58. The slide rail 6 is provided on the rotating shaft base 57. An ordinary linear rail matched with a slider remains stationary and can only achieve linear movement of the slider. In contrast, in the present disclosure, due to the spiral shape of the slide rails 6 matched with the sliders 7, when the sliders 7 are moved up and down in a straight line, the slide rails 6 are driven by the sliders 7, resulting in transverse movement. The rotating shafts 5 convert the transverse movement into rotation, which in turn drives the side wings 4 to rotate and unfold. The up and down movement of the sliders 7 follows the movement of the headrest 3, allowing the headrest 3 to be linked with the side wings 4. The sliders 7 are slid up and down to unfold or fold the side wings 4, thereby adjusting a width of the side wings 4 to suit different users. Such a linkage structure occupies less space and spares more space for other components of the backrest 1. In addition, the child safety seat features a simple structure, high reliability, and low production cost. The detachable backrest 1 and base 2 are convenient for storage in idle times. After the backrest 1 is disassembled, the base 2 can serve as a booster cushion, extending the applicable age range of the child safety seat.

In order to reduce the overall volume and ensure structural strength, two sides of the backrest 1 are provided with inwardly recessed mounting slots 8. The rotating shafts 5 are provided in the mounting slots 8. Through the mounting slots 8, the rotating shafts 5 are provided inside the backrest 1. The space occupation at the two sides is reduced, and the contact between the side wings 4 and the backrest 1 is increased. Thus, the impact received by the side wings 4 can be transmitted to the backrest 1, increasing the impact resistance of the side wings 4 and improving safety.

Figure 14:
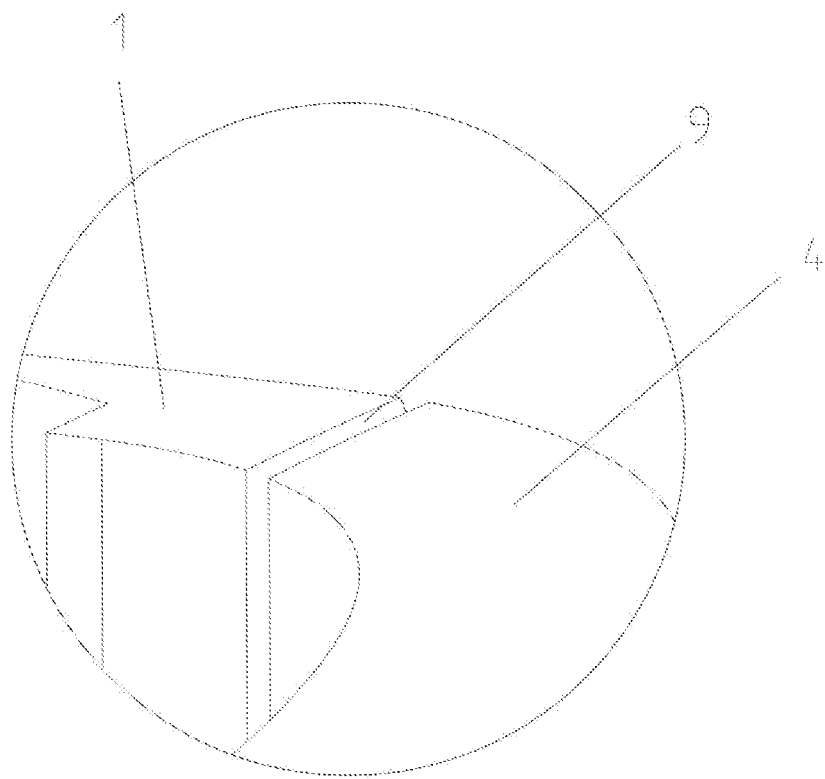
FIG. 14 is an enlarged view of D shown in FIG. 1.

In order to ensure the rotation reliability of the side wings 4, as shown in FIG. 14, gap 9 is provided between the side wing 4 and the backrest 1. The gap 9 leaves a rotation margin for the side wings 4 to ensure normal rotation of the side wings 4.

Figure 5:
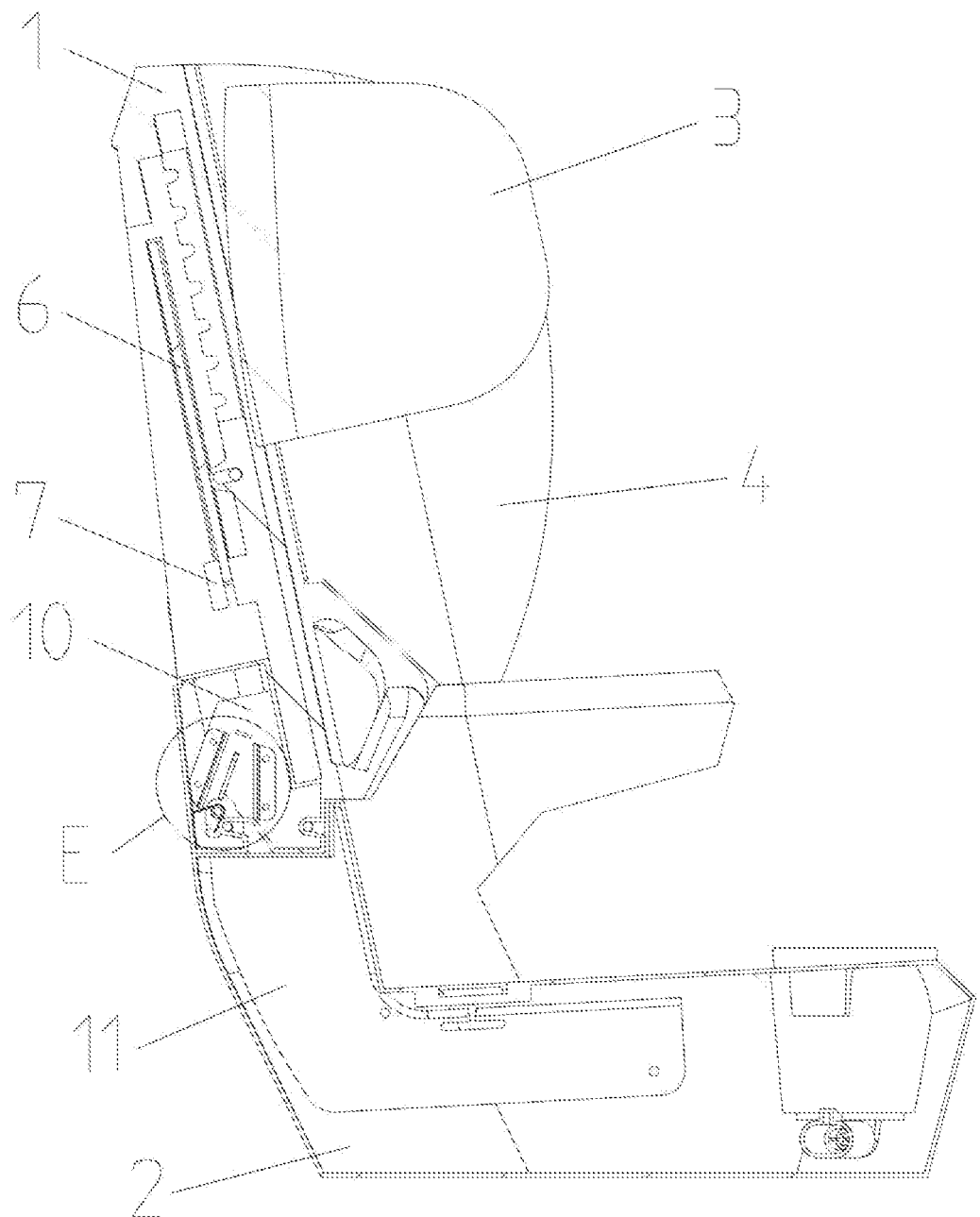
FIG. 5 is a sectional view taken along A-A direction shown in FIG. 3.

In order to improve strength, as shown in FIG. 5, the backrest 1 is provided with backrest frames 10. One side of the backrest frame 10 is abutted against a side wall of the mounting slot 8. The backrest frames 10 are configured to improve the overall strength of the backrest 1. Since the one side of the backrest frame 10 is abutted against the side wall of the mounting slot 8, a distance between the backrest frame 10 and the rotating shaft 5 is reduced. In this way, the impact received by the side wings 4 can be transmitted to the backrest frame 10, increasing the impact resistance of the side wings 4 and improving safety.

In order to improve strength, the base 2 is provided with base frame 11. The base frame 11 enhances the overall strength of the base 2.

Figure 6:
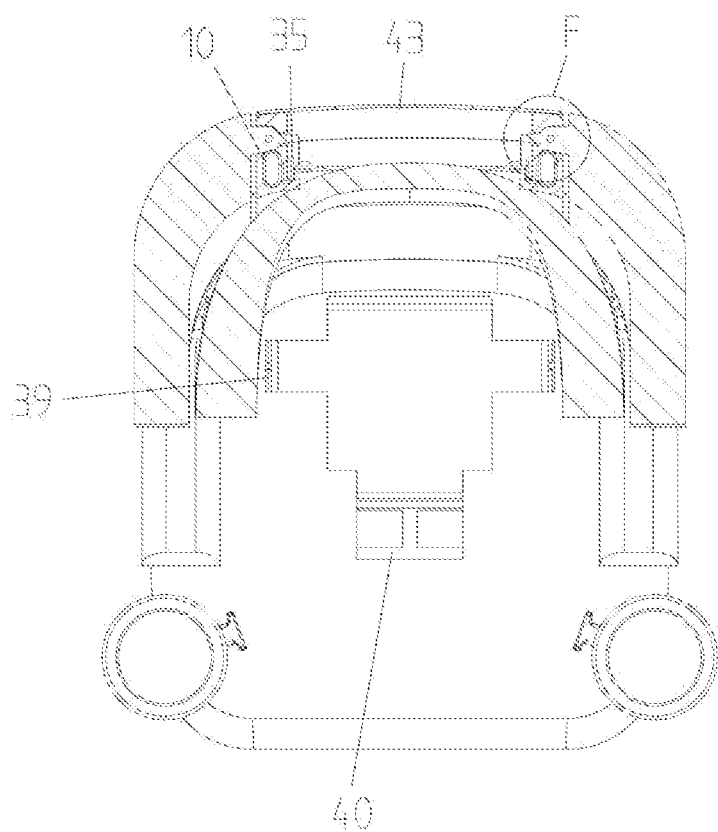
FIG. 6 is a sectional view taken along B-B direction shown in FIG. 3.
Figure 7:
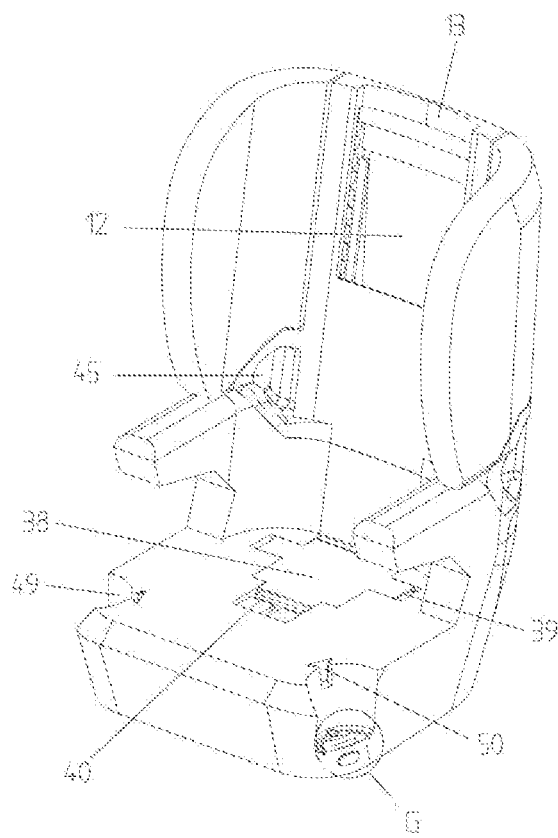
FIG. 7 is a structural diagram of the child safety seat, with cup holders and a headrest removed, according to Embodiment 1 of the present disclosure.
Figure 16:
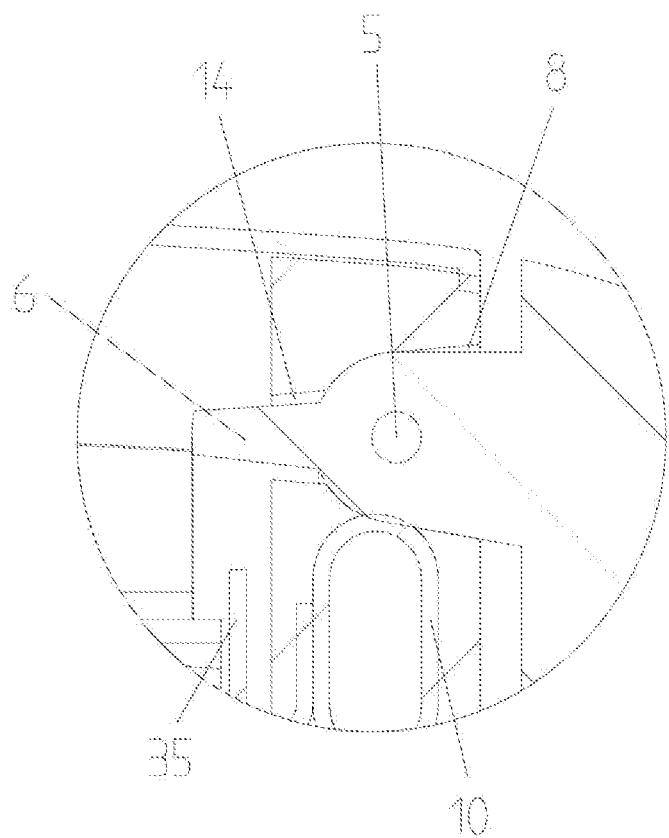
FIG. 16 is an enlarged view of F shown in FIG. 6.

In order to achieve mounting reliability, as shown in FIGS. 6, 7, and 16, the backrest 1 is provided with hollow inner chamber 12. A top of the inner chamber 12 is provided with notch 13. The notch 13 is connected to an outside. A part of the headrest 3 passes through the notch 13, and is provided in the inner chamber 12. The mounting slot 8 is provided with through slot 14 communicated with the inner chamber 12. A part of the slide rail 6 passes through the through slot 14, and is provided in the inner chamber 12. A width of the through slot 14 is greater than a width of the slide rail 6. The inner chamber 12 is configured for partial storage and mounting of the headrest 3. A head supporting part of the headrest 3 is extended out of the notch 13. The through slot 14 is configured for the passage of the slide rail 6. The width of the through slot 14 is larger, making it easy for the slide rail 6 to rotate, so as to cause the side wings 4 to rotate.

In order to achieve rotation reliability of the side wings 4, a length direction of the rotating shaft 5 extends along a length direction of the backrest 1. Due to the length direction of the rotating shaft 5 extending along the length direction of the backrest 1, it is convenient to mount the rotating shaft 5 and increase the length of the rotating shaft 5, achieving desired rotation stress.

In order to improve strength, the rotating shaft 5 is made of metal. The metal rotating shaft 5 features high structural strength, wear resistance, and long service life, and can increase the impact resistance of the side wings 4, improving safety.

In order to ensure the unfolding reliability of the side wings 4, a distance between the slide rail 6 and a movement route of the headrest 3 gradually increases from bottom to top. When the headrest 3 is moved upwards, the slider 7 is synchronously moved upwards. The slider 7 drives the distant slide rail 6 at an upper end to approach the headrest 3. Thus, the side wings 4 are rotated synchronously to unfold the side wings 4.

Figure 8:
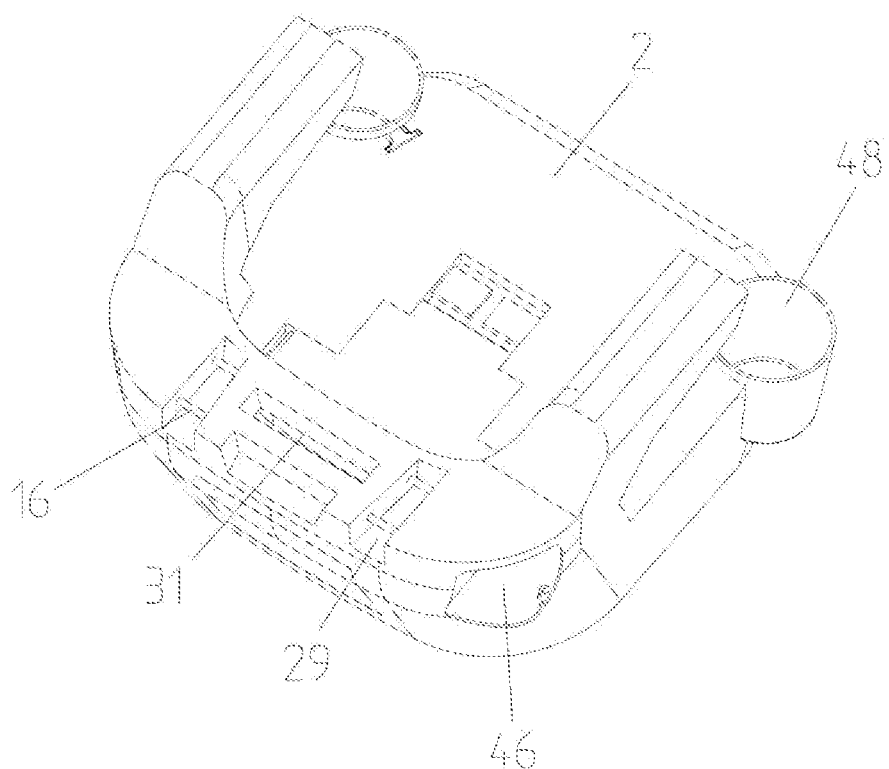
FIG. 8 is a structural diagram of a base according to Embodiment 1 of the present disclosure.
Figure 9:
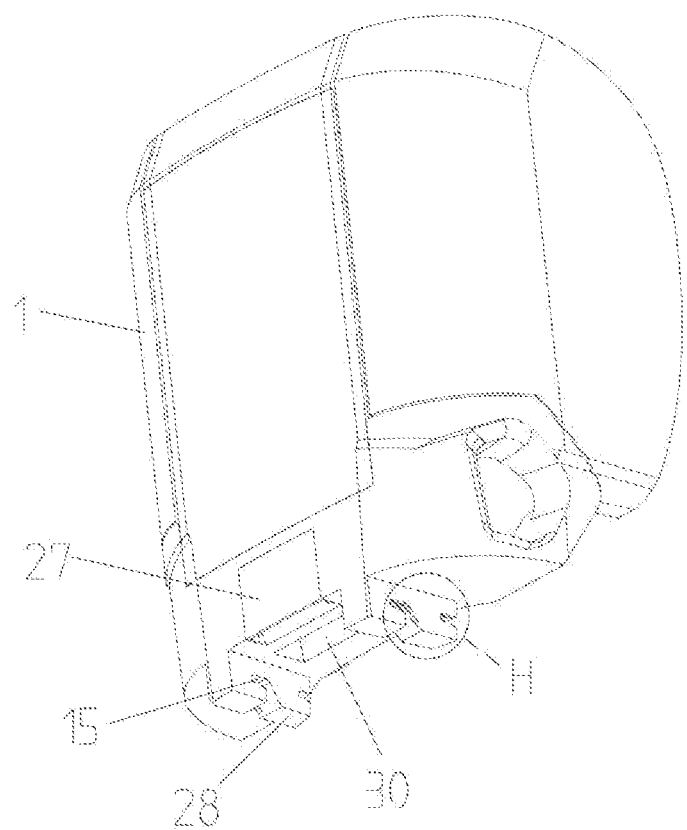
FIG. 9 is a structural diagram of the backrest according to Embodiment 1 of the present disclosure.
Figure 15:
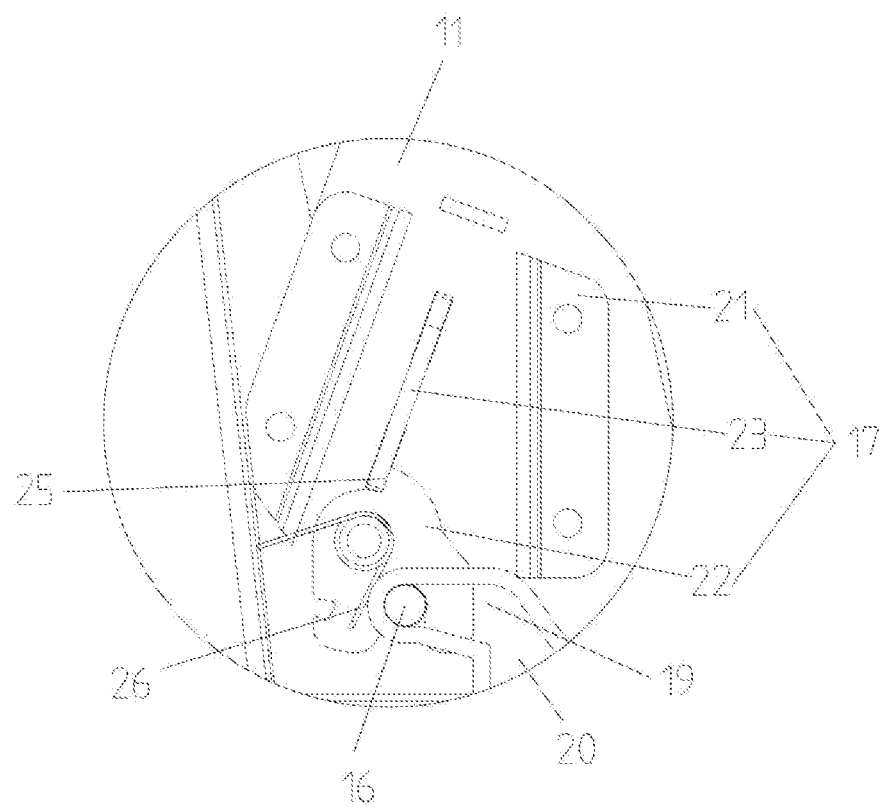
FIG. 15 is an enlarged view of E shown in FIG. 5.

In order to achieve the disassembly reliability of the backrest 1 and the base 2, as shown in FIGS. 8, 9, and 15, the backrest 1 is provided with at least two fixing slots 15 arranged transversely. The fixing slots 15 are connected to the outside. The base 2 is provided with fixed shafts 16 matched with the fixing slots 15. The backrest 1 is provided with at least one first locking mechanism 17 for clamping the fixed shafts 16. In this embodiment, there are two first locking mechanisms 17 for fixing from left and right sides to achieve firm fixation. The fixing slots 15 are configured to accommodate the fixed shafts 16. The fixing slots 15 are transversely provided to prevent the fixed shafts 16 from being moved up or down inside the fixing slots 15. The at least two fixing slots 15 prevent the backrest 1 from rotating around the fixed shafts 16. The fixing slots 15 are connected to the outside, making it easy for the fixed shafts 16 to be directly clamped into the fixing slots 15, rather than being passed into the fixing slots 15, achieving easy mounting. The first locking mechanisms 17 are configured to fix the fixed shafts 16 and prevent the fixed shafts 16 from being moved. When the fixed shaft 16 is in a locked state, the fixed shaft 16 is abutted against one transverse side of the fixing slot 15. The fixed shaft 16 is restricted from top to bottom by the fixing slot 15. Due to the abutment restriction of the one transverse side, the first locking mechanism 17 only needs to restrict the other transverse side to achieve the complete fixation of the fixed shaft 16. The overall detachable design is convenient for storage in idle times. After the backrest 1 is disassembled, the base 2 can serve as a booster cushion, extending the applicable age range of the child safety seat.

In order to improve strength, the fixing slots 15 are provided in the backrest frames 10. The fixed shafts 16 are connected to the base frame 11. Since the fixing slots 15 are provided in the backrest frames 10, the strength of the fixing slots 15 is ensured. The fixed shafts 16 are connected to the base frame 11 to ensure the strength of the fixed shafts 16. The backrest frames 10 are connected to the base frame 11, so the impact during use is borne by the frames. The design achieves strong overall impact resistance and high usage stability. In addition, there are two pin points provided at two sides. In this way, the connection strength between the frames is high, and the backrest 1 is not easy to shake.

Figure 18:
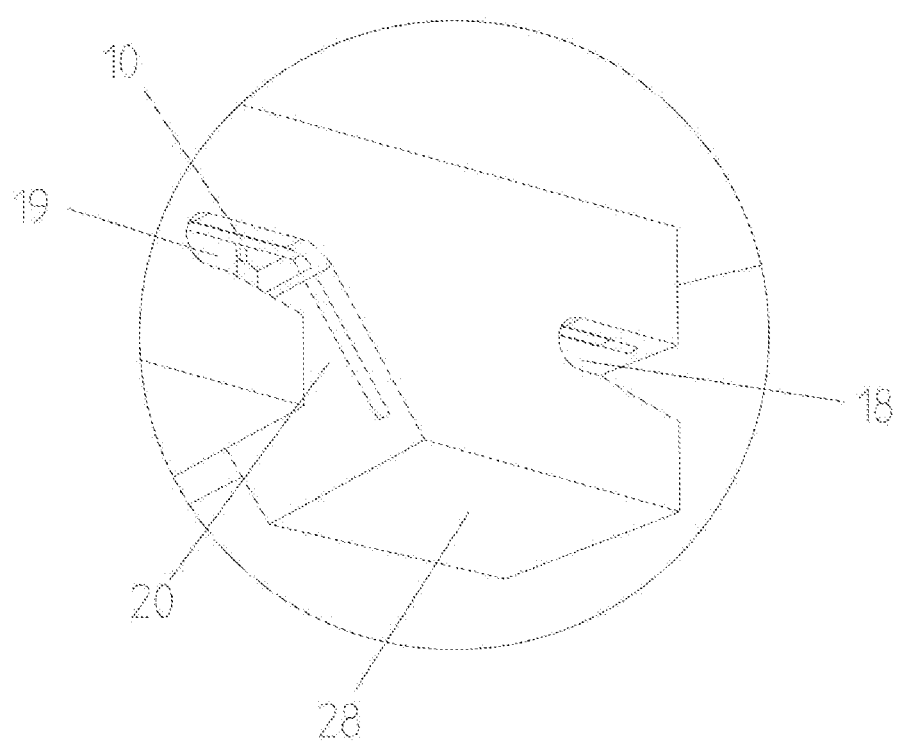
FIG. 18 is an enlarged view of H shown in FIG. 9.

In order to achieve the fixation reliability of the backrest 1 and the base 2, as shown in FIG. 18, the fixing slot 15 includes first fixing slot 18 and second fixing slot 19. The first fixing slot 18 transversely runs through to the outside. The second fixing slot 19 is connected to the outside through first inclined slot 20. The first inclined slot 20 is inclined towards a side towards which the first fixing slot 18 is opened. The first fixing slot 18 transversely runs through, allowing the fixed shaft 16 to directly enter transversely. The first inclined slot 20 is configured to cause the fixed shaft 16 to enter the second fixing slot 19. When in use, the first fixing slot 18 is directly sleeved onto one fixed shaft 16. When the first fixing slot 18 is directly sleeved onto the one fixed shaft 16, the other fixed shaft 16 enters the second fixing slot 19 through the first inclined slot 20. In this embodiment, the first locking mechanism 17 is provided at a side of the second fixing slot 19.

Figure 10:
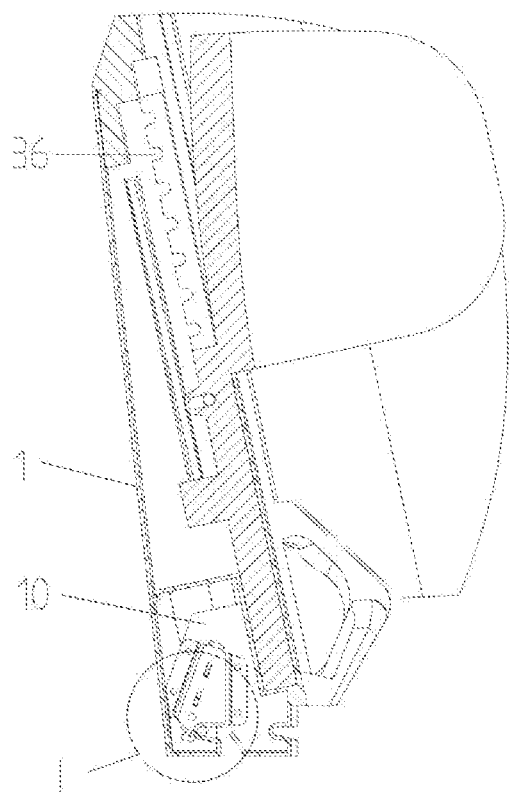
FIG. 10 is a sectional view of the backrest according to Embodiment 1 of the present disclosure.
Figure 11:
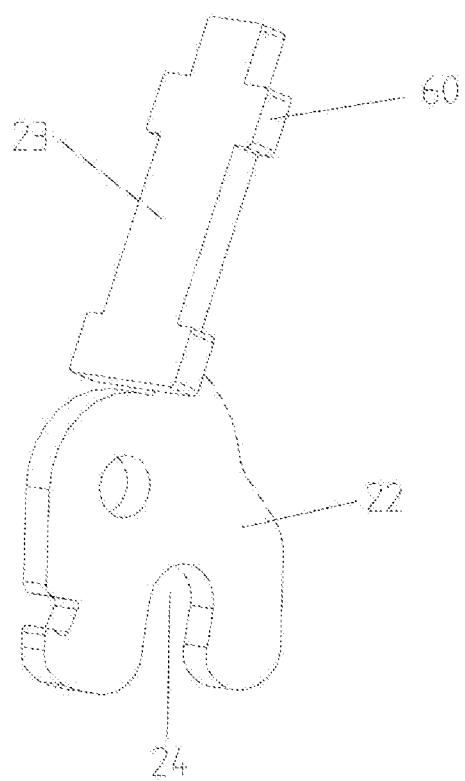
FIG. 11 is a structural diagram of a locking pin that blocks a locking element according to Embodiment 1 of the present disclosure.
Figure 19:
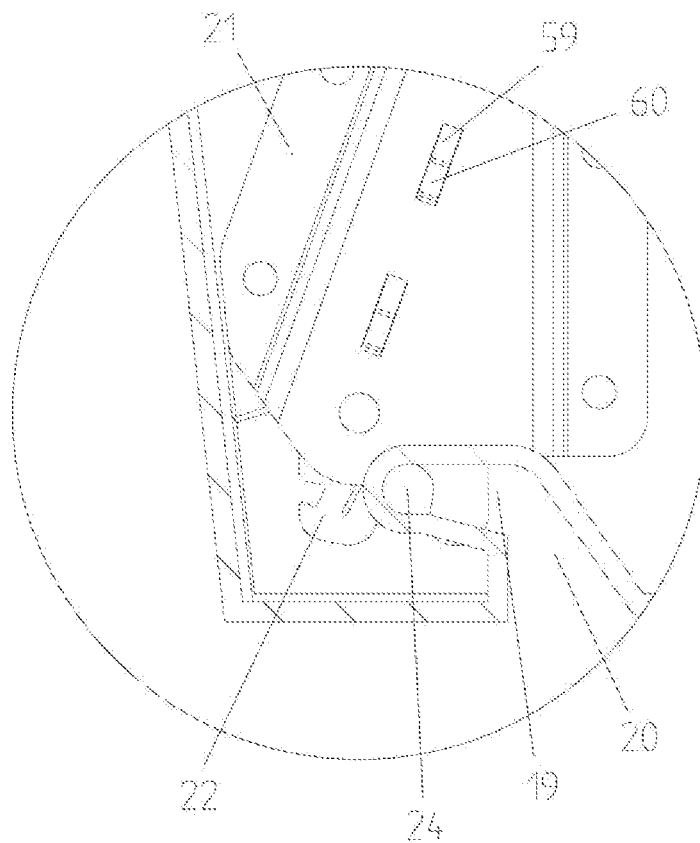
FIG. 19 is an enlarged view of I shown in FIG. 10.

In order to achieve locking reliability, as shown in FIGS. 10, 11, and 19, the first locking mechanism 17 includes mounting base 21, locking element 22, and locking pin 23. The locking element 22 is rotatably connected to the mounting base 21. The locking pin 23 is slidably connected to the mounting base 21. The locking element 22 is provided with limit slot 24 and stopper 25. When the fixed shaft 16 is in the locked state, the locking pin 23 is abutted against the stopper 25, and the second fixing slot 19 forms a closed structure with the limit slot 24. When the fixed shaft 16 is in an unlocked state, one side of the limit slot 24 is provided in the second fixing slot 19. The mounting base 21 is provided on the backrest 1. The mounting base 21 is provided with sliding slot 59. The locking pin 23 is provided with moving element 60 matched with the sliding slot 59. The mounting base 21 is configured to provide mounting support. The locking element 22 is configured to lock the fixed shaft 16 and prevent transverse movement of the fixed shaft 16. The locking pin 23 is configured to fix the locking element 22 and prevent rotation of the locking element 22. The limit slot 24 is configured to fix the fixed shaft 16. The stopper 25 is configured to be matched with the locking pin 23. The locking pin 23 blocks the stopper 25, preventing the locking element 22 from rotating. To lock, when the fixed shaft 16 enters the fixing slot 15, it is synchronously clamped into the limit slot 24 and drives the locking element 22 to rotate until the fixed shaft 16 is abutted against the one transverse side of the fixing slot 15. At this point, the stopper 25 on the locking element 22 is at a lower position, and the locking pin 23 can fall under the action of gravity. A side of the locking pin 23 is abutted against the stopper 25, blocking the rotation of the locking element 22. The fixed shaft 16 is blocked inside by the fixing slot 15 and outside by the limit slot 24, thereby achieving the locking of the fixed shaft 16. To unlock, the locking pin 23 is pulled upwards to separate the locking pin 23 from the stopper 25. At this point, the fixed shaft 16 can be moved outward to drive the locking element 22 to rotate, keeping the stopper 25 away from the locking pin 23. After the fixed shaft 16 is moved out, the stopper 25 is abutted against the mounting base 21, preventing the locking element 22 from rotating unrestricted and facilitating the next entry of the fixed shaft 16.

In order to achieve reliability in use, reset spring 26 for resetting the locking element 22 is provided between the locking element 22 and the mounting base (21. The reset spring 26 is configured to keep the locking element 22 in an unlocked state, facilitating the entry of the fixed shaft 16.

In order to improve strength, the mounting base 21 is connected to the backrest frame 10. The mounting base 21 is connected to the backrest frame 10 to improve the fixation strength of the mounting base 21, thereby increasing the locking strength of the first locking mechanism 17 on the fixed shaft 16 and achieving reliable locking.

In order to facilitate unlocking, the backrest 1 is provided with unlocking puller 27 linked to the locking pin 23. Specifically, the unlocking puller 27 can be linked with the locking pin 23 through a steel wire rope. The unlocking puller 27 facilitates the unlocking and disassembly of the backrest 1 and the base 2.

In order to facilitate the mounting of the backrest 1 and the base 2, a bottom of the backrest 1 is provided with at least one downward guide lug 28. The base 2 is provided with guide slot 29 matched with the guide lug 28. The guide lug 28 and the guide slot 29 are matched with each other to facilitate the mounting and positioning of the backrest 1 and the base 2, and improve stability.

In order to facilitate mounting, the fixing slot 15 is provided in the guide lug 28, and the fixed shaft 16 is provided in the guide slot 29. In this way, the matched mounting of the guide lug 28 and the guide slot 29 is synchronized with the matched mounting of the fixing slot 15 and the fixed shaft 16, making it easy to mount and disassemble.

In order to improve stability, there are two guide lugs 28 and two guide slots 29 matched with the two guide lugs. The design improves directionality and stability.

In order to improve strength, the fixed shaft 16 runs through the two guide slots 29, and is connected to the base frame 11 at two sides. The fixed shaft 16 is not segmented, improving the strength of the fixed shaft 16 and ensuring the connection strength between the backrest 1 and the base 2.

In order to facilitate the passage of a five-point seat belt, the backrest 1 is provided with upper channel 30, and the base 2 is provided with lower channel 31. The upper channel 30 is communicated with the lower channel 31. The upper channel 30 and the lower channel 31 are configured for the passage of the seat belt.

In order not to affect the first locking mechanism 17, the upper channel 30 is provided between the two guide lugs 28, and the lower channel 31 is provided between the two guide slots 29. The upper channel 30 and the lower channel 31 are provided in middle positions to ensure the passage of the five-point seat belt and offer sufficient movement space, avoiding the impact of the seat belt on the unlocking of the first locking mechanism 17.

In order to improve strength, the lower channel 31 is provided between two adjacent fixed shafts 16. Since the lower channel 31 is provided between the fixed shafts 16, the seat belt is supported by the fixed shafts 16, improving the tension strength of the seat belt.

Figure 12:
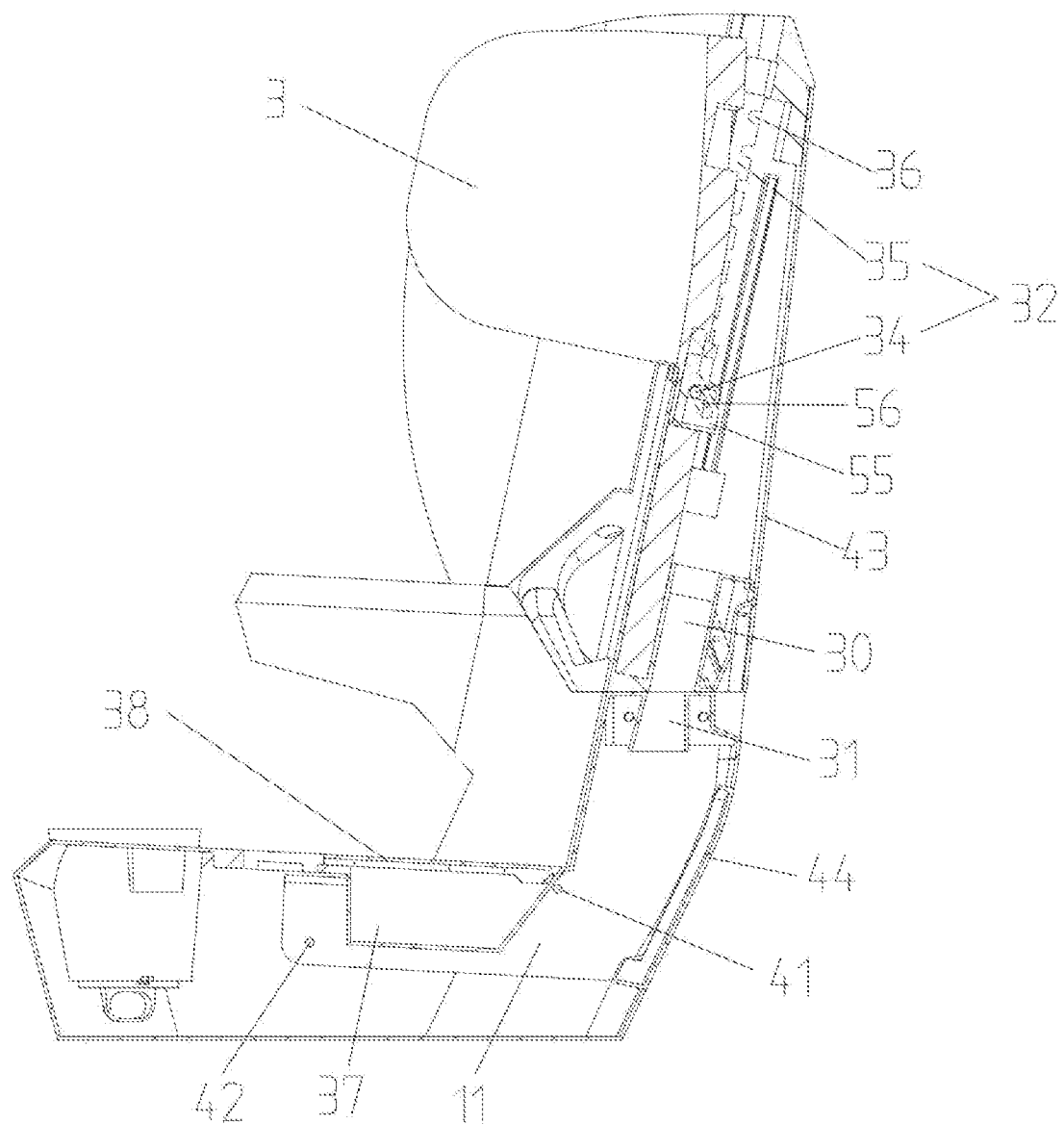
FIG. 12 is a sectional view taken along C-C direction shown in FIG. 3.

In order to achieve the use reliability of the seat belt, as shown in FIG. 12, the headrest 3 is provided with second locking mechanism 32. The second locking mechanism 32 is provided at a back of the headrest 3. The headrest 3 is provided with shoulder belt hole 33. The second locking mechanism 32 includes locking pin shaft 34 and multi-position fixing plates 35. The locking pin shaft 34 is provided below the shoulder belt hole 33. The locking pin shaft 34 is connected to the headrest 3. The fixing plates 35 are connected to the backrest 1. The five-point seat belt passes through the shoulder belt hole 33. The locking pin shaft 34 is matched with the fixing plates 35 during height adjustment of the headrest 3 to achieve position fixation, and also ensure that the five-point seat belt is pressed onto the locking pin shaft 34 after being passed through the shoulder belt hole 33. The impact on the seat belt is transmitted to the backrest 1 through the locking pin shaft 34, thereby increasing the use stability and reliability of the seat belt and reducing direct impact on the headrest 3. The locking pin shaft 34 is moved with the up and down movement of the headrest 3, such that there is a certain distance between the shoulder belt hole 33 and the locking pin shaft 34, ensuring the impact transmission effect of the seat belt.

In order to improve strength, the fixing plates 35 are connected to the backrest frames 10. Due to the connection between the fixing plates 35 and the backrest frames 10, the strength of the fixing plates 35 is improved. The impact on the seat belt is transmitted to the backrest frames 10 through the locking pin shaft 34, thereby increasing the use stability and reliability of the seat belt.

In order to improve the strength of the backrest 1, the backrest frames 10 are symmetrically arranged. Two ends of the locking pin shaft 34 are respectively connected to the fixing plates 35 at two sides. The two symmetrical backrest frames 10 enhance the strength of the backrest 1 and achieve stable stress. Since the two ends of the locking pin shaft 34 are respectively connected to the fixing plates 35, the forces on the two ends of the locking pin shaft 34 are transmitted to the backrest frames 10, increasing the use stability and reliability of the seat belt.

In order to achieve use reliability, the fixing plate 35 is provided with a U-shaped cross-section. The U-shaped cross-section includes one side provided with position slot 36 and the other side connected to the backrest frame 10. The U-shaped design of the fixing plate 35 improves the strength of the fixing plate 35. In addition, since the one side of the U-shaped cross-section is connected to the backrest frame 10 while the other side is configured for position fixation of the locking pin shaft 34, the two sides do not interfere with each other, making it easy to use.

In order to facilitate the storage of the seat belt, the base 2 is provided with seat belt slot 37. When not in use, the seat belt is placed in the seat belt slot 37 to achieve a beautiful appearance, prevent loss of the seat belt, and reduce the collision sound of the seat belt.

In order to facilitate the storage of the seat belt, the seat belt slot 37 is provided in a central position of an upper surface of the base 2, and the seat belt slot 37 is provided with cover plate 38 that is rotatable to be opened. The cover plate 38 covers the seat belt slot 37, providing protection for the seat belt inside the seat belt slot 37 and providing support for a child sitting on the base 2.

In order to facilitate the storage of the seat belt, symmetrical waist belt holes 39 are provided at two sides of the seat belt slot 37. The waist belt holes 39 located at the two sides of the seat belt slot 37 are convenient to pass the seat belt and place the seat belt into the seat belt slot 37.

In order to facilitate the storage of the seat belt, crotch belt hole 40 is provided in front of the seat belt slot 37. The crotch belt hole 40 located in front of the seat belt slot 37 is convenient to pass the seat belt and place the seat belt into the seat belt slot 37.

In order to improve the strength of the base 2, the base frame 11 is provided with first reinforcing rod 41 and second reinforcing rod 42. The first reinforcing rod 41 is provided behind the waist belt holes 39, and the second reinforcing rod 42 is provided below the crotch belt hole 40. The first reinforcing rod 41 and the second reinforcing rod 42 improve the overall strength of the base 2. The first reinforcing rod 41 is located behind the waist belt holes 39 to facilitate pressing the seat belt onto the first reinforcing rod 41, so as to transmit the impact on the seat belt to the base frame 11 through the first reinforcing rod 41, thereby increasing the use stability and reliability of the seat belt. The second reinforcing rod 42 is provided below the crotch belt hole 40 to facilitate pressing the seat belt onto the second reinforcing rod 42, so as to transmit the impact on the seat belt to the base frame 11 through the second reinforcing rod 42, thereby increasing the use stability and reliability of the seat belt.

In order to facilitate the mounting of the seat belt on the backrest 1, a back of the backrest 1 is provided with upper cover plate 43 that is rotatable to be opened. The upper cover plate 43 facilitates the mounting and disassembly of the seat belt.

In order to facilitate the mounting of the seat belt on the base 2, a back of the base 2 is provided with lower cover plate 44 that is rotatable to be opened. The lower cover plate 44 facilitates the mounting and disassembly of the seat belt.

In order to facilitate mounting, binding holes 45 are provided at two sides of the backrest 1. The binding holes 45 are configured to fix the mounting of a flexible FIX joint. The FIX joint is provided with a binding position that is a relatively high position, which offers a great torque relative to the base 2, improving the overall stability of the child safety seat.

In order to facilitate storage, the base 2 is provided with storage chamber 46. The storage chamber 46 is configured to store the flexible FIX joint, achieving a clean overall appearance and reducing the loss rate of the flexible FIX joint.

In order to facilitate storage, the storage chamber 46 is provided with side cover plate 47 that is rotatable to be opened. The side cover plate 47 is configured to shield the storage chamber 46, achieving overall aesthetics.

In order to improve practicality, the base 2 is provided with cup holder 48. The cup holder 48 is convenient to hold water cups for easy drinking and hold small items so as to preventing the child's small toys from being lost.

In order to improve practicality, two cup holders 48 are provided at two sides of the base 2, achieving a beautiful and symmetrical design. The two cup holders 48 enhance practicality.

In order to facilitate the placement of the cup holders 48, the base 2 is provided with arc-shaped concaves 49, and the cup holders 48 are provided in the arc-shaped concaves 49. The arc-shaped concaves 49 facilitate the placement of the cup holders 48, reduce the space occupation outwards, and reduce the overall volume.

Figure 13:
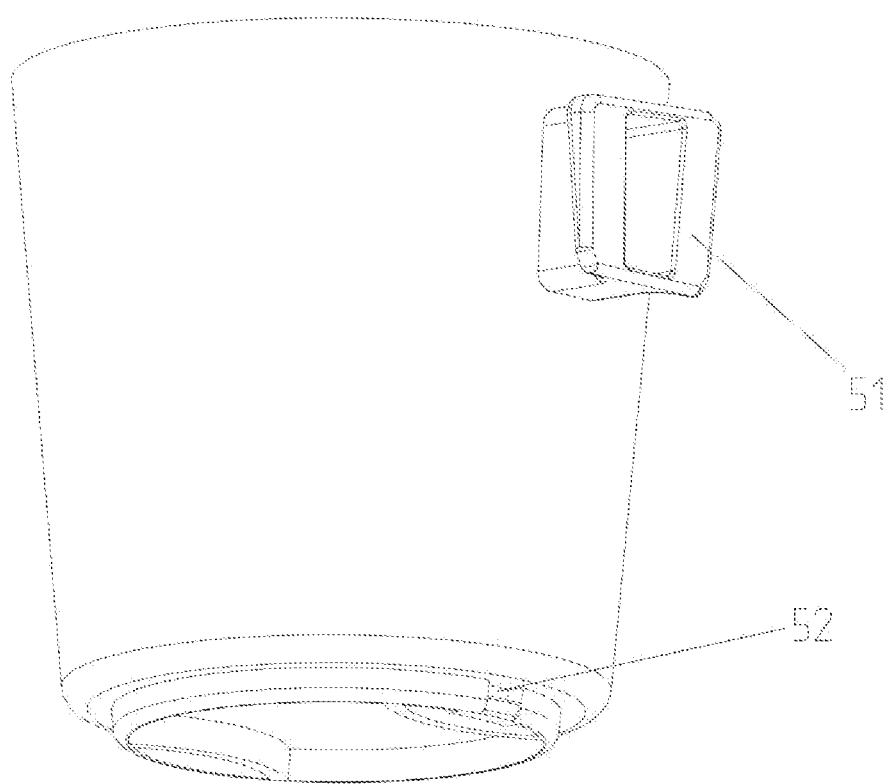
FIG. 13 is a structural diagram of the cup holder according to Embodiment 1 of the present disclosure.

In order to firmly place the cup holders 48, as shown in FIG. 13, the base 2 is provided with positioning slots 50. The cup holder 48 is provided with positioning element 51 matched with the positioning slot 50. The positioning slot 50 is communicated with the arc-shaped concave 49. The positioning slot 50 and the positioning element 51 are matched with each other to guide the cup holder 48 and facilitate the storage and retrieval of the cup holder 48.

Figure 17:
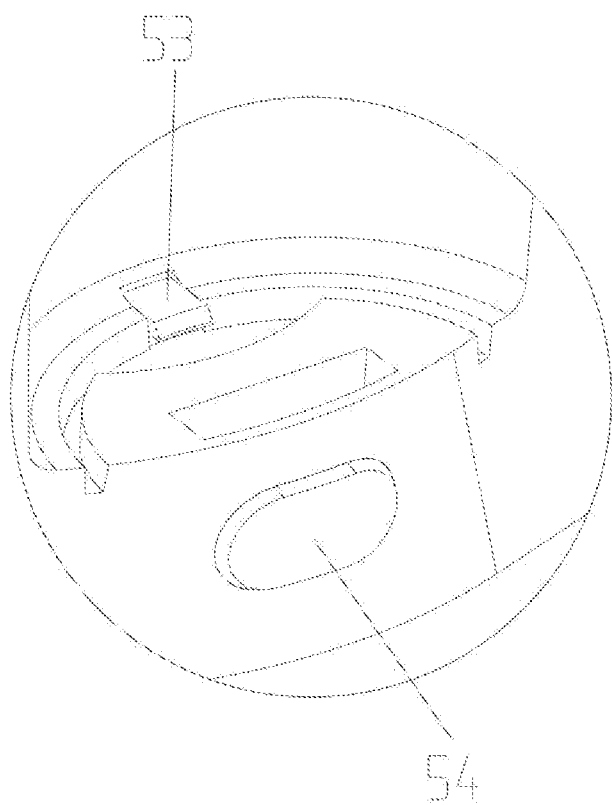
FIG. 17 is an enlarged view of G shown in FIG. 7.

In order to firmly place the cup holder 48, as shown in FIG. 17, the cup holder 48 is provided with buckle slot 52. The base 2 is provided with buckle 53 matched with the buckle slot 52. After the cup holder 48 is placed, the buckle slot 52 and the buckle 53 matched play a fixing role to prevent the cup holder 48 from accidentally falling.

In order to facilitate the retrieval of the cup holder 48, the base 2 is provided with button 54. The button 54 is linked with the buckle 53. The button 54 facilitates the unlocking of the buckle 53 and the retrieval of the cup holder 48.

In order to facilitate the height adjustment of the headrest 3, the second locking mechanism 32 includes unlocking slider 55. The unlocking slider 55 is provided with second inclined slot 56. The locking pin shaft 34 is inserted into the second inclined slot 56. One end of the unlocking slider 55 is rotatably connected to the headrest 3. The unlocking slider 55 can self-reset and can be implemented through a torsion spring or a reset tension spring. The unlocking slider 55 is provided for position adjustment of the headrest 3. When the locking pin shaft 34 is locked to the fixing plate 35, the unlocking slider 55 is rotate. Thus, the unlocking slider 55 drives the locking pin shaft 34 to move outward, causing the locking pin shaft 34 to detach from the fixing plate 35. At this point, the headrest 3 is unlocked and its height can be adjusted up and down. After the adjustment, the unlocking slider 55 is reset to drive the locking pin shaft 34 back to the position slot 36 of the fixing plate 35, thereby completing a locking purpose. When the unlocking slider 55 is rotated, due to the second inclined slot 56, the locking pin shaft 34 has a movable margin to avoid being stuck on the fixing plate 35, facilitating the entry and exit of the locking pin shaft 34.

The above described are only preferred embodiments of the present disclosure, and are not intended to limit the present disclosure in any form. Although the preferred embodiments of the present disclosure are described above, they are not intended to limit the present disclosure. Those skilled in the art may make some changes or modifications to implement equivalent embodiments with equivalent changes by using the technical contents disclosed above without departing from the scope of the technical solution of the present disclosure. Any simple modification, equivalent change and modification made to the foregoing embodiments according to the technical essence of the present disclosure without departing from the content of the technical solution of the present disclosure should fall within the scope of the technical solution of the present disclosure.

What is claimed is:

1. A child safety seat, comprising a backrest and a base, wherein the backrest and the base are detachably connected; the backrest is provided with a headrest, wherein the headrest is movable up and down; side wings are provided at two sides of the headrest; the side wings are connected to the backrest through rotating shafts; opposite sides of the side wings are provided with slide rails; the headrest is provided with sliders matched with the slide rails; and the slide rails are provided in a same direction as the rotating shafts,
wherein two sides of the backrest are provided with inwardly recessed mounting slots; the rotating shafts are provided in the inwardly recessed mounting slots; a gap is provided between each of the side wings and the backrest; the backrest is provided with backrest frames; one side of each of the backrest frames is abutted against a side wall of each of the inwardly recessed mounting slots; and the base is provided with a base frame.

2. The child safety seat according to claim 1, wherein the backrest is provided with a hollow inner chamber; a top of the hollow inner chamber is provided with a notch; the notch is connected to an outside; a part of the headrest passes through the notch, and is provided in the hollow inner chamber; each of the inwardly recessed mounting slots is provided with a through slot communicated with the hollow inner chamber; a part of each of the slide rails passes through the through slot, and is provided in the hollow inner chamber; and a width of the through slot is greater than a width of the each of slide rails.

3. A child safety seat, comprising a backrest and a base, wherein the backrest and the base are detachably connected; the backrest is provided with a headrest, wherein the headrest is movable up and down; side wings are provided at two sides of the headrest; the side wings are connected to the backrest through rotating shafts; opposite sides of the side wings are provided with slide rails; the headrest is provided with sliders matched with the slide rails; and the slide rails are provided in a same direction as the rotating shafts,
wherein a length direction of each of the rotating shafts extends along a length direction of the backrest; each of the rotating shafts is made of metal; and a distance between each of the slide rails and a movement route of the headrest gradually increases from bottom to top.

4. The child safety seat according to claim 1, wherein the backrest is provided with at least two fixing slots arranged transversely; the at least two fixing slots are connected to an outside; the base is provided with fixed shafts matched with the at least two fixing slots; the backrest is provided with at least first and second locking mechanisms for clamping the fixed shafts; the at least two fixing slots are provided in the backrest frames; the fixed shafts are connected to the base frame; each of the at least two fixing slots comprises a first fixing slot and a second fixing slot.

5. The child safety seat according to claim 4, wherein each of the first and second locking mechanisms comprises a mounting base, a locking element, and a locking pin; the locking element is rotatably connected to the mounting base; the locking pin is slidably connected to the mounting base; the locking element is provided with a limit slot and a stopper; when the fixed shaft is in a locked state, the locking pin is abutted against the stopper, and the second fixing slot forms a closed structure with the limit slot; when the fixed shaft is in an unlocked state, one side of the limit slot is provided in the second fixing slot; a reset spring for resetting the locking element is provided between the locking element and the mounting base; the mounting base is connected to the backrest frame; and the backrest is provided with an unlocking puller linked to the locking pin.

6. The child safety seat according to claim 4, wherein a bottom of the backrest is provided with at least one downward guide lug; the base is provided with a guide slot matched with the guide lug; the fixing slot is provided in the guide lug, and the fixed shaft is provided in the guide slot; there are two guide lugs and two guide slots matched with the two guide lugs; the fixed shaft runs through the two guide slots; the backrest is provided with an upper channel; the base is provided with a lower channel; the upper channel is communicated with the lower channel; the upper channel is provided between the two guide lugs; the lower channel is provided between the two guide slots; and the lower channel is provided between two adjacent fixed shafts.

7. The child safety seat according to claim 1, wherein the headrest is provided with a thirdlocking mechanism; the second locking mechanism is provided at a back of the headrest; the headrest is provided with a shoulder belt hole; the second locking mechanism comprises a locking pin shaft and multi-position fixing plates; the locking pin shaft is provided below the shoulder belt hole; the locking pin shaft is connected to the headrest; the multi-position fixing plates are connected to the backrest; the multi-position fixing plates are connected to the backrest frames; the backrest frames are symmetrically arranged; two ends of the locking pin shaft are respectively connected to the multi-position fixing plates at two sides; each of the multi-position fixing plates is provided with a U-shaped cross-section; and the U-shaped cross-section comprises one side provided with a position slot and a second side connected to the backrest frame.

8. The child safety seat according to claim 7, wherein the base is provided with a seat belt slot; the seat belt slot is provided in a central position of an upper surface of the base; the seat belt slot is provided with a cover plate, wherein the cover plate is rotatable to be opened; symmetrical waist belt holes are provided at two sides of the seat belt slot; a crotch belt hole is provided in front of the seat belt slot; the base frame is provided with a first reinforcing rod and a second reinforcing rod; the first reinforcing rod is provided behind the waist belt holes; the second reinforcing rod is provided below the crotch belt hole; a back of the backrest is provided with an upper cover plate, wherein the upper cover plate is rotatable to be opened; a back of the base is provided with a lower cover plate, wherein the lower cover plate is rotatable to be opened; binding holes are provided at two sides of the backrest; the base is provided with a storage chamber; and the storage chamber is provided with a side cover plate, wherein the side cover plate is rotatable to be opened.

9. The child safety seat according to claim 8, wherein the base is provided with cup holders; the cup holders are provided at two sides of the base; the base is provided with arc-shaped concaves; the cup holders are provided in the arc-shaped concaves; the base is provided with positioning slots; the cup holder is provided with a positioning element matched with the positioning slot; the positioning slot is communicated with the arc-shaped concave; the cup holder is provided with a buckle slot; the base is provided with a buckle matched with the buckle slot; the base is provided with a button; the button is linked with the buckle; the second locking mechanism comprises an unlocking slider; the unlocking slider is provided with a second inclined slot; the locking pin shaft is inserted into the second inclined slot; and one end of the unlocking slider is rotatably connected to the headrest.

\* \* \* \* \*